United States Patent [19]

Wikle

[11] 4,179,314

[45] Dec. 18, 1979

[54] TREATMENT OF BERYLLIUM-COPPER ALLOY AND ARTICLES MADE THEREFROM

[75] Inventor: Keith G. Wikle, Riverview Park, Pa.

[73] Assignee: Kawecki Berylco Industries, Inc., Boyertown, Pa.

[21] Appl. No.: 968,218

[22] Filed: Dec. 11, 1978

[51] Int. Cl.² .................................................. C22C 9/04
[52] U.S. Cl. .................................. 148/12.7 C; 148/160
[58] Field of Search .................... 148/11.5 C, 12.7 C, 148/160; 75/153

[56] References Cited

U.S. PATENT DOCUMENTS

| | | | |
|---|---|---|---|
| 2,027,750 | 1/1936 | Munson | 148/12.7 |
| 2,257,708 | 9/1941 | Stott | 148/12.7 |
| 2,412,447 | 12/1946 | Donachie | 148/160 |
| 2,527,983 | 10/1950 | Brown et al. | 148/12.7 |
| 3,133,843 | 5/1964 | Scherbner | 148/160 |
| 3,196,006 | 7/1965 | Lane et al. | 148/12.7 |
| 3,240,635 | 3/1966 | Hose et al. | 148/160 |

FOREIGN PATENT DOCUMENTS

| | | | |
|---|---|---|---|
| 521927 | 6/1940 | United Kingdom | 148/12.7 C |
| 621224 | 4/1949 | United Kingdom | 148/12.7 C |

OTHER PUBLICATIONS

Pfeiffer et al.—*Metallwissenschaft und Technik*, vol. 22(11), pp. 1125-1129, (Nov. 1968).
Wikle, "Heat Treatment of Beryllium Copper Alloys," Industrial Heating, Nov. 1973, pp. 24-31.
Covington, "Heat Treating Copper and Copper Alloys," *Metal Progress*, May 1974, pp. 75-79.
Harrington, "The Metallurgy of Modern Alloys-Type IIA-Double Aging, " *Steel Processing, Feb. 1944, pp. 101-105.*

Primary Examiner—L. Dewayne Rutledge
Assistant Examiner—Peter K. Skiff
Attorney, Agent, or Firm—Pennie & Edmonds

[57] ABSTRACT

Copper-based alloys containing minor amounts of beryllium, cobalt and/or nickel, and zirconium are subjected to treatment comprising, in sequence: annealing followed by quenching; cold working; a second optional annealing followed again by quenching; a cold working; an initial age hardening treatment; a secondary age hardening treatment; if necessary, straightening the alloy; and stress relieving the straightened alloy. Optimum elevated temperature properties are developed in alloys treated according to the present invention and articles made of the treated alloys are useful under conditions involving high operating speed and elevated temperature.

21 Claims, No Drawings

TREATMENT OF BERYLLIUM-COPPER ALLOY AND ARTICLES MADE THEREFROM

TECHNICAL FIELD

This invention relates to the treatment of copper-based alloys. More particularly, it relates to a novel thermal treatment of shaped beryllium-copper alloys to optimize conductance and mechanical properties at elevated temperatures.

BACKGROUND ART

Heat-treatable beryllium-copper alloys have been known for several decades and are noted for having good formability and machinability. Metallurgists have sought, by various heat treatments, to provide such alloys with high mechanical strength while retaining high electrical conductivity. In the past, the strengths of these alloys were increased by cold working and age hardening. However, it was found that if the alloy is allowed to recrystallize during aging, the cold worked structure and the associated increased strength are lost. In order to age the alloy below the recrystallization temperature, small quantities of zirconium and/or hafnium were introduced into the alloy to raise the recrystallization temperature of the alloy after cold working.

Beryllium conductor bronzes are high conductivity, wrought and casting beryllium-copper based alloys containing between about 0.25 and 0.7% by weight beryllium, up to about 2.8% cobalt, and up to about 2.0% nickel. These alloys, which are discussed in detail by Pfeiffer and Honig in Metallwissenschaft und Technik, vol. 22(11), pp. 1125-9 (November 1968), have electrical conductivities of up to 32 m/ohm $mm^2$ and good tensile strengths (up to 140 ksi) at elevated temperatures. By subjecting heat-treatable beryllium conductor bronzes to two separate heat treatments, it was found that one could optimize these desirable properties. The alloy is first subjected to an annealing or solution heat treatment which consists of heating the alloy to solutionize the beryllium in the copper matrix. The beryllium is then "frozen" in the solution by rapidly quenching the alloy to room temperature. Cold working followed by age hardening optimizes the hardness and tensile strength properties. During the age hardening step, the electrical conductivity of the alloy is found to increase with time.

The Lane et al. U.S. Pat. No. 3,196,006 teaches a beryllium-copper based alloy containing 0.4 to 0.7% by weight beryllium, 2 to 3% cobalt and/or nickel, 0.12 to 0.4% zirconium and/or hafnium and the balance copper with small amounts (<0.05%) of incidental impurities (including lead). These alloys are disclosed for use in the fabrication of large electrical generator components such as rotor wedges which can be cast to shape or wrought by hot and cold working.

Rotor wedges secure the copper windings of the rotors which rotate at high velocities. Under normal operating conditions the periphery of these rotors travel at almost sonic speeds. The centrifugal force generated by these conditions exerts as much as 25,000 psi (1800 kg/cm$^2$) stress on the wedges. These stresses occur at operating temperatures as high as 200° C. Unusual circumstances can cause the rotor to occasionally operate at even higher speeds and temperatures, adding still more stress and heat to the rotor wedges. According to the Lane et al. patent, as-cast or wrought beryllium-copper for use in making rotor wedges is treated by a process which involves annealing at temperatures of about 750° C. and above, followed promptly by quenching. Next, the members are cold worked and then aged at temperatures of from 300°-600° C. to develop desirable strength and hardness.

Copper Alloy CA 175 is a commercial alloy containing nominally 2.5% cobalt and 0.5% beryllium. When CA 175 undergoes precipitation hardening treatment, it acquires a highly desirable combination of strength (100-120 ksi) and high electrical conductivity (greater than 45% that of pure copper) at room temperature. Due to these properties, the alloy is useful for making resistance welding electrodes, electrical switches, springs, contacts, or tooling material. These desirable properties, however, are temperature dependent; at elevated temperatures, i.e., above 100° C., CA 175 becomes notch sensitive when exposed to long term constant stress loading. Under these conditions CA 175 exhibits low fracture toughness. Impact or cyclic loading conditions at elevated temperatures also result in low fracture toughness. Notch sensitivity and resultant low fracture toughness can lead to serious premature failure in parts having notched designs. This tendency for notched parts to prematurely fail at elevated temperatures in a brittle mode has excluded CA 175 from those applications, e.g., rotor wedges, which require a combination of high strength and electrical conductivity at elevated temperatures.

As previously mentioned, generator rotors are subjected to high stress from the centrifugal forces present during the generation of electricity. Furthermore, these generators operate at temperatures as high as 400° F. (204° C.). Due to these high temperature stress conditions, CA 175 processed according to the prior art has a tendency to fail prematurely in notched stress rupture at operating temperatures as low as 302° F. (150° C.). Even the copper-based alloys disclosed in the aforementioned Lane et al. patent have demonstrated poor stress rupture properties when evaluated under conditions similar to those for the CA 175 determinations.

A need has therefore existed, particularly in the electrical generator field, for shaped beryllium-copper alloys having improved high temperature strength and especially notched stress rupture resistance, while retaining good electrical and thermal conductance properties.

Accordingly, it is an object of the present invention to provide copper-based alloys having a combination of high strength and conductivity.

Another object is to provide shaped beryllium-copper alloys which retain optimum tensile strength and electrical conductivity at high use temperatures.

Another object is to provide improved shaped beryllium-copper alloys useful in fabricating rotor wedges for electrical generators and which retain optimum notched stress rupture resistance and thermo-electrical conductivity at high operating speeds and temperatures.

Another object is to provide a process for treating copper-based alloys to impart thereto a desirable combination of high strength and conductivity.

Another object is to provide a process for thermally treating shaped beryllium-copper alloys to impart optimum strength and electrical conductivity retention at high use temperatures.

Yet another object is to provide an improved thermal treatment for shaped beryllium-copper alloys which are used in fabricating rotor wedges for electrical generators and which retain optimum notched stress rupture resistance and thermo-electrical conductivity at high operating speeds and temperatures.

These and other objects of the invention as well as an understanding of the advantages thereof can be had by reference to the following disclosure and claims.

DISCLOSURE OF INVENTION

The foregoing objects are achieved according to the present invention whereby BeCu alloy such as the type comprising the following components and proportions:

| Component | Weight % |
|---|---|
| Be | ca. 0.2–ca. 1.0 |
| Co | up to ca. 5.0 |
| Ni | up to ca. 3.5 |
| Ni + Co | ca. 0.7–ca. 5.0 |
| Zr and/or Hf | up to ca. 1.0 |
| Pb | up to ca. 0.005 |
| Impurities (including Pb) | up to ca. 0.5 |
| Cu | Balance | is processed from the cast or hot-worked state according to the following sequence of steps:

I. A solution heat treatment (annealing) at between about 1500° F. (815° C.) and about 1800° F. (982° C.), preferably between about 1650° F. (900° C.) and about 1750° F. (955° C.) in air, followed by quenching, e.g., to ambient or room temperature (ca. 40° C. or less), and preferably in cold water, for a period of time depending on the shape and size of the alloy;

II. Cold working the alloy a minimum of about 30%, preferably between about 30% and about 40%, e.g., by rolling or cold drawing;

III. A second desirable but optional solution heat treatment (annealing) at between about 1500° F. and about 1800° F., preferably between about 1650° F. and about 1750° F. in air, followed again by quenching, e.g., to room temperature, and preferably in cold water, for a period of time depending on the shape and size of the alloy;

IV. Cold working the alloy a minimum of about 30%, preferably between about 30 and about 40%, e.g., by rolling or cold drawing;

V. An initial or primary age hardening treatment at a temperature of between about 500° F. (260° C.) and about 800° F. (430° C.), preferably between about 550° F. (290° C.) and about 700° F. (370° C.), for a period of between about 0.25 and about 48 hours, and preferably between about 1 and about 8 hours;

VI. A subsequent or secondary age hardening treatment at a temperature of between about 900° F. (480° C.) and about 1200° F. (650° C.), preferably between about 950° F. (510° C.) and about 1050° F. (565° C.), for a period of between about 0.25 and about 48 hours, and preferably between about 3 and about 24 hours;

VII. If necessary, straightening the alloy, preferably at ambient temperature; and VIII. Stress relieving the straightened alloy at a temperature of between about 900° F. (430° C.) and about 1000° F. (540° C.), preferably between about 850° F. (455° C.) and about 950° F. (510° C.), for between about 0.5 and about 6 hours, preferably between about 2 and about 4 hours.

Without wishing to be bound by theory, it is believed that the first annealing or solution heat treatment (I) and cold working or reduction (II) together create a metallurgical state of affairs in either a cast or cast and hot worked alloy from which a uniform finegrained structure is brought about by the second annealing or solution heat treatment (III). The first heat treatment is believed to establish an optimum crystallographic structure for strength and toughness in the final alloy; the second heat treatment and subsequent cold working (IV) optimize the response of the alloy to subsequent age hardening and impart optimum tensile and notch stress rupture strength to the alloy for maximum in-service performance reliability, e.g., as generator rotor wedges. The initial or primary aging step (V) establishes a maximum number of precipitation sites thereby optimizing the response of the alloy to the subsequent or secondary aging step (VI). The secondary aging step is actually an over-aging treatment that optimizes strength/fracture toughness properties and imparts the most favorable notched stress rupture values to the alloy.

The above process provides a notched-to-unnotched tensile strength ratio which is greater than unity up to a temperature of 800° F. (430° C.). Also, the notched stress rupture time is greater than that of unnotched alloys for 50,000 psi (3600 kg/cm$^2$) stress at 400° F. (200° C.) and is accompanied by a favorable low frequency notched fatigue strength at room temperature. Upon comparison, the notched stress concentration factor in the treated alloys of this invention is greater than or equal to that expected to be encountered in rotor wedges in large commercial electrical generator installations. Specifically, when beryllium-copper alloys are treated as herein described, the sensitivity to notching of articles made from alloy thus treated is sufficiently reduced so as to make them desirable for use as rotor wedges in large commercial generators, or in such additional applications where tensile strength, good metal stress rupture properties, high toughness and high conductivity are required.

DESCRIPTION OF PREFERRED EMBODIMENTS

The following examples are intended to illustrate without limitation the practice of the present invention and the advantages thereof. In the examples, as well as in the specification generally, all parts and percentages are by weight unless unless otherwise indicated.

EXAMPLE 1

A beryllium-copper alloy suitable for use in the present invention has the following preferred composition:

| | |
|---|---|
| Be | 0.3–0.7% |
| Co | 2.0–3.0% |
| Ni | up to 0.1% |
| Zr | up to 0.5% |
| Pb | up to 0.005% |
| Impurities (including Pb) | up to 0.3% |
| Cu | Balance |

The alloy in the cast or hot worked state is annealed by a solution heat treatment at 1650°–1750° F. (900°–955° C.) and then quenched. The alloy is then cold worked to the extent of 30–40%. Next, the alloy is subjected to a secondary annealing by solution heat treatment at 1650°–1750° F. followed by another quenching. Again, it is cold worked to the extent of 30–40%. The initial or primary age hardening treatment consists of heating the alloy at 600° F. (315° C.) for 2–8 hours. A subsequent or secondary age hardening treatment involves a 6-18 hour exposure of the alloy to a temperature of 1000° F. (540° C.). If any straightening is necessary and executed, the alloy is thereafter reheated at 900° F. (480° C.) for a 3-hour period to relieve any stresses incurred in the optional straightening step.

EXAMPLE 2

Another preferred beryllium-copper alloy suitable for use in the present invention has the following composition:

| | |
|---|---|
| Be | 0.2–0.5% |
| Co | up to 0.1% |
| Ni | 1.0–2.0% |
| Zr | up to 0.5% |
| Pb | up to 0.005% |
| Impurities (including Pb) | up to 0.3% |
| Cu | Balance |

The alloy in the cast or hot worked state is annealed by a solution heat treatment at 1650°–1750° F. and then quenched. The alloy is then cold worked to the extent of 30–40%. Next, the alloy is subjected to a secondary annealing by solution heat treatment at 1650°–1750° F. followed by another quenching. Again, it is cold worked to the extent of 30–40%. The initial age hardening treatment consists of heating the alloy at 600° F. for 2–8 hours. A secondary age hardening treatment involves a 6–18 hour exposure of the alloy to a temperature of 1000° F. If any straightening is necessary, the alloy is straightened at room temperature. Finally, the alloy is stress relieved at 900° F. for up to 3 hours after the optional straightening step.

EXAMPLE 3

Another beryllium-copper alloy suitable for use in the present invention has the following composition:

| | |
|---|---|
| Be | 0.2–0.7% |
| Co | 0.7–1.3% |
| Ni | 0.7–1.3% |
| Zr | up to 0.5% |
| Pb | up to 0.005% |
| Impurities (including Pb) | up to 0.3% |
| Cu | Balance |

The alloy in the cast or hot worked state is annealed by a solution heat treatment at 1650°–1750° F. and then quenched. The alloy is then cold worked to the extent of 30–40%. Next, the alloy is subjected to a secondary annealing by solution heat treatment at 1650°–1750° F. followed by another quenching. Again, it is cold worked to the extent of 30–40%. The initial age hardening treatment comprises heating the alloy at 600° F. for 2–8 hours. A subsequent secondary age hardening treatment involves a 6–18 hour exposure of the alloy to a temperature of 1000° F. If any straightening is necessary, the alloy is straightened at room temperature. Finally, the beryllium-copper based alloy is stress relieved for 3 hours at 900° F. after the optional straightening step.

EXAMPLE 4

Another beryllium-copper alloy suitable for use in the present invention has the following composition:

| | |
|---|---|
| Be | 0.2–0.6% |
| Co | 1.0–3.0% |
| Ni | 0.5–1.5% |
| Zr | up to 0.5% |
| Pb | up to 0.005% |
| Impurities (incl. Pb) | up to 0.3% |
| Cu | Balance |

The alloy in the cast or hot worked state is annealed by a solution heat treatment at 1650°–1750° F. and then quenched. The alloy is then cold worked to the extent of 30–40%. Next, the alloy is subjected to a secondary annealing by solution heat treatment at 1650°–1750° F. followed by another quenching.

Again, it is cold worked to the extent of 30–40%. The initial age hardening treatment consists of heating the alloy at 700° F. (370° C.) for 1–4 hours. A subsequent secondary age hardening treatment involves a 3–9 hour exposure of the alloy to 1050° F. (565° C.). If any straightening is necessary, the alloy is straightened at room temperature. Finally, the alloy is stress relieved for 3 hours at 900° F. after the optional straightening step.

EXAMPLE 5

Another preferred beryllium-copper alloy suitable for use in the present invention has the following composition:

| | |
|---|---|
| BE | 0.3–0.7% |
| Co | 2.0–3.0% |
| Ni | up to 0.1% |
| Zr | up to 0.5% |
| Pb | up to 0.005% |
| Impurities (incl. Pb) | up to 0.3% |
| Cu | Balance |

The alloy in the cast or hot worked state is annealed by a solution heat treatment at 1650°–1750° F. and then quenched. The alloy is then cold worked to the extent of 30–40%. Next, the alloy is subjected to a secondary annealing by solution heat treatment at 1650°–1750° F. followed by another quenching. Again, it is cold worked to the extent of 30–40%. The initial age hardening treatment consists of heating the alloy at 500° F. (260° C.) for 16–48 hours. A secondary age hardening treatment involves a 24–48 hour exposure of the alloy at 950° F. (510° C.). If any straightening is necessary, the alloy is straightened at room temperature. Finally, the alloy is stress relieved for 3 hours at 900° F. after the optional straightening step.

EXAMPLE 6

Another preferred beryllium-copper alloy suitable for use in the present invention has the following composition:

| | |
|---|---|
| Be | 0.5% |
| Co | 1.0% |
| Ni | 1.0% |
| Zr | up to 0.4% |
| Pb | up to 0.005% |
| Impurities (including Pb) | up to 0.3% |
| Cu | Balance |

The alloy in the cast or hot worked state is annealed by a solution heat treatment at 1650°–1750° F. and then quenched. The alloy is then cold worked to the extent of 30-40%. Next, the alloy is subjected to a secondary annealing by solution heat treatment at 1650°-1750° F. followed by another quenching. Again, it is cold worked to the extent of 30-40%. The initial age hardening treatment consists of heating the alloy at 600° F. (315° C.) for 2 hours. A subsequent secondary age hardening treatment involves a 12-hour exposure of the alloy to a temperature of 1000° F. (540° C.). If any straightening is necessary, the alloy is straightened at room temperature. Finally, the alloy is stress relieved for 3 hours at 900° F. after the optional straightening step.

EXAMPLE 7

Another preferred beryllium-copper alloy suitable for use in the present invention has the following composition:

| | |
|---|---|
| Be | 0.3% |
| Co | 1.5% |
| Zr | up to 0.4% |
| Pb | up to 0.005% |
| Impurities (including Pb) | up to 0.3% |
| Cu | Balance |

The alloy in the cast or hot worked state is annealed by a solution heat treatment at 1650°-1750° F. and then quenched. The alloy is then cold worked to the extent of 30-40%. Next, the alloy is subjected to a secondary annealing by solution heat treatment at 1650°-1750° F. followed by another quenching. Again, it is cold worked to the extent of 30-40%. The initial age hardening treatment consists of heating the alloy at 600° F. for 2 hours. A subsequent secondary age hardening treatment involves a 12-hour exposure of the alloy to a temperature of 1000° F. If any straightening is necessary, the alloy is straightened at room temperature. Finally, the alloy is stress relieved for 3 hours at 900° F. after the optional straightening step.

EXAMPLE 8

Another preferred beryllium-copper alloy suitable for use in the present invention has the following composition:

| | |
|---|---|
| Be | 0.5% |
| Co | 2.5% |
| Zr | up to 0.4% |
| Pb | up to 0.005% |
| Impurities (including Pb) | up to 0.3% |
| Cu | Balance |

The alloy in an as-cast or wrought shape is annealed by a solution heat treatment at 1650°-1750° F. and then quenched. The alloy is then cold worked to the extent of 30-40%. Next, the alloy is subjected to a secondary annealing by solution heat treatment at 1650°-1750° F. followed by another quenching. Again, it is cold worked to the extent of 30-40%. The initial age hardening treatment consists of heating the alloy at 600° F. for 2 hours. A subsequent age hardening treatment involves a 12-hour exposure of the alloy to a temperature of 1000° F. If any straightening is necessary, the alloy is straightened at room temperature. Finally, the alloy is stress relieved for 3 hours at 900° F. after the optional straightening step.

EXAMPLE 9

Two separate samples of commercially available C17500 (Cu-Co-Be) alloys having the following compositions:

| | C17500 | C17500 + Zr |
|---|---|---|
| Be | 0.69% | 0.54% |
| Co | 2.95% | 2.8 |
| Zr | 0.06 | 0.3 |
| Pb | 0.001 | 0.001 |
| Cu | Balance | Balance | are subjected to the following fabrication sequence:
1. Semi-continuous casting to form 7-inch (177.9 mm) diameter billets;
2. Scalping and cutting to length;
3. Preheating to 1500° F. (815° C.);
4. Extruding from 7-inch diameter billets to 2.093 inch (53.16 mm)×2.093 inch (53.16 mm) bar;
5. Solution heat treating at 1700° F. (925° C.) and H₂O quenching;
6. Pickling;
7. Pointing;
8. Drawing to 1.750 inch (44.45 mm)×1.750 inch (44.45 mm) (30% reduction);
9. Solution heat treating at 1700° F. (925° C.) and H₂O quenching;
10. Pickling;
11. Pointing;
12. Drawing to 1.640 inch (41.66 mm)×1.640 inch (41.66 mm) (12% reduction);
13. Drawing to 1.506 inch (38.25 mm)×1.506 inch (38.25 mm) (26% reduction);
14. Drawing to 1.504 inch (38.20 mm)×1.315 inch (33.40 mm) (35% reduction)

Room temperature tensile strength data for fabricated samples subjected to various age hardening treatments are presented in Table I.

Tensile data at 800° F. (425° C.) for fabricated samples subjected to various age hardening treatments are presented in Table II (for C17500 alloy) and Table III (for C17500+Zr alloy).

Table I

| Alloy | % Cold Working | Age* Treatment | Test Direction | UTS ksi | 0.2% YS ksi | Elongation % in ½" (13 mm) |
|---|---|---|---|---|---|---|
| C17500 | 26 | A | Long | 122 | 109 | 14 |
| " | " | B | " | 95 | 80 | 14 |
| " | " | C | " | 91 | 77 | 15½ |
| C17500 | 35 | A | Long | 118 | 106 | 18 |
| " | " | B | " | 85 | 70 | 18 |
| " | " | C | " | 86 | 71 | 16 |
| C17500 | 35 | A | Short Transverse | 110 | 102 | 7½ |
| " | " | B | " | 84 | 68 | 17 |

Room Temperature Tensile Data** for Smooth Tensile Test Bars

Table I-continued

Room Temperature Tensile Data** for Smooth Tensile Test Bars

| Alloy | % Cold Working | Age* Treatment | Test Direction | UTS ksi | 0.2% YS ksi | Elongation % in ½" (13 mm) |
|---|---|---|---|---|---|---|
| | " | C | " | 80 | 66 | 12 |
| C17500 + Zr | 26 | A | Long | 118 | 109 | 10 |
| | " | B | " | 93 | 80 | 11½ |
| | " | C | " | 92 | 77 | 14½ |
| | 35 | A | Long | 123 | 114 | 12½ |
| | " | B | " | 92 | 77 | 12 |
| | " | C | " | 89 | 74 | 18 |
| | 35 | A | Short Transverse | 104 | 101 | 4 |
| | " | B | " | 86 | 72 | 11 |
| | " | C | " | 84 | 70 | 9½ |

*A = 3 hrs. at 900° F. (480° C.)
B = 3 hrs. at 600° F. (315° C.) + 15 hrs. at 1000° F. (540° C.)
C = 15 hrs. at 1000° F. (540° C.)
**Strain Rate = 0.00013 in/sec. (0.0033 mm/sec.)

Table II

800° F. Smooth & Notched Tensile Data for C17500 Alloy

| Alloy | % Cold Working | Aging Treatment* | Test Direction | Smooth Bar UTS ksi | 0.2% YS ksi | % Elong. in ½" (13 mm) | Notched Bar**** UTS** ksi | UTS*** ksi | NSR** Ratio of UTS Notched/Unnotched |
|---|---|---|---|---|---|---|---|---|---|
| C17500 | 26 | A | Long | 80 | 49 | — | 51 | — | 0.64 |
| " | " | B | " | 58 | 52 | 4 | 73 | — | 1.23 |
| " | " | C | " | 57 | 53 | 6 | 68 | — | 1.19 |
| " | 35 | A | Long | 77 | 71 | 1 | 57 | — | 0.74 |
| " | " | B | " | 53 | 45 | 8 | 75 | 89 | 1.42 |
| " | " | C | " | 52 | 45 | 6 | 72 | — | 1.38 |
| " | 35 | A | Short Transv. | 62 | 49 | 1 | 31 | — | 0.50 |
| " | " | B | " | 48 | 41 | 4 | 65 | 75 | 1.35 |
| " | " | C | " | 47 | 40 | 6 | 66 | 78 | 1.40 |

*A = 3 hrs. at 900° F. (480° C.)
B = 3 hrs. at 600° F. (315° C.) + 15 hrs. at 1000° F. (540° C.)
C = 15 hrs. at 1000° F. (540° C.)
**Strain Rate = 0.00013 in/sec. (0.0033 mm/sec.)
***Strain Rate = 0.0027 in/sec. (0.068 mm/sec.)
****Sample dia. was 0.124" (3.1 mm), notched dia. was 0.089" (2.3 mm), the notch angle was 60°, the notch radius was .005"

Table III

800° F. Smooth & Notched Tensile Data for C17500 + .31 Zr Alloy

| Alloy | % Cold Working | Aging Treatment* | Test Direction | Smooth Bar UTS ksi | 0.2% YS ksi | % Elong. in ½" (13 mm) | Notched Bar**** UTS** ksi | UTS*** ksi | NSR** Ratio of UTS Notched/Unnotched |
|---|---|---|---|---|---|---|---|---|---|
| C17500 + Zr | 26 | A | Long | 68 | 65 | 1 | 30 | — | 0.44 |
| C17500 + Zr | " | B | " | 56 | 52 | 6 | 51 | — | 0.91 |
| C17500 + Zr | " | C | " | 55 | 53 | 3 | 51 | — | 0.93 |
| C17500 + Zr | 35 | A | Long | 67 | 66 | 0.5 | 38 | 56 | 0.57 |
| C17500 + Zr | " | B | " | 54 | 53 | 6 | 67 | 85 | 1.24 |
| C17500 + Zr | " | C | " | 53 | 48 | 6 | 65 | 81 | 1.23 |
| C17500 + Zr | 35 | A | Short Transv. | 58 | 56 | 0.5 | 23 | 49 | 0.40 |
| C17500 + Zr | " | B | " | 48 | 42 | 3 | 53 | 69 | 1.10 |
| C17500 + Zr | " | C | " | 46 | 42 | 1 | 54 | 73 | 1.17 |

*A = 3 hrs. at 900° F. (480° C.)
B = 3 hrs. at 600° F. (315° C.) + 15 hrs. at 1000° F. (540° C.)
C = 15 hrs. at 1000° F. (540° C.)
**Strain Rate = 0.00013 in/sec. (0.0033 mm/sec.)
***Strain Rate = 0.0027 in/sec. (0.068 mm/sec.)
****Sample dia. was 0.124" (3.1 mm), notched dia. was 0.089" (2.3 mm), the notch angle was 60°, the notch radius was .005"

The foregoing data indicate that C17500 alloys processed in accordance with the present invention and exhibiting a NSR (notch stress ratio) of over 1.0 in tensile testing at 800° F. (425° C.) have notch stress rupture values at 400° F. (205° C.) of over 50 ksi for 1000 hours. Alloys exhibiting such notched stress rupture properties perform in a superior manner in applications involving elevated temperatures, e.g., as a rotor wedge material. They provide a highly desirable combination of fracture toughness, strength and electrical conductivity at the 400° F. operating temperature necessary to insure safe long service rotor wedge life for large turbine driven generators.

INDUSTRIAL APPLICABILITY

The present invention provides a treatment for copper-based alloys (e.g., CA 17500) wherein the fabricator (e.g., manufacturers of large electrical generators) can take advantage of the good strength and high electrical and thermal conductivity of the alloy without being concerned about premature stress rupture occurring at high operating temperatures (e.g., 200° C.) and the accompanying severe loss to the user (e.g., electric utility company) in both human life and equipment.

Many other commercial uses are possible for beryllium-copper alloys treated according to the present invention. Examples of such uses are brake drums, permanent molds for casting of metal, dies, punches, wind tunnel throats, rocket nozzles, current carrying springs, electrical switches and electrodes including resistance welding electrodes.

I claim:

1. A process for treating beryllium-copper alloy to optimize elevated temperature properties thereof, said process comprising in sequence:
   (a) annealing the alloy at a temperature of between about 1500° F. and about 1800° F.;
   (b) quenching the annealed alloy;
   (c) cold working the quenched alloy a minimum of about 30%;
   (d) subjecting the cold worked alloy to an initial age hardening for between about 0.25 and about 48 hours at a temperature of between about 500° F. and about 800° F.; and
   (e) subjecting the age-hardened alloy to a secondary age hardening for between about 0.25 and about 48 hours at a temperature of between about 900° F. and about 1200° F.

2. The process according to claim 1 wherein the alloy is annealed in step (a) by solution heat treatment at a temperature of between about 1650° F. and about 1750° F.

3. The process according to claim 1 wherein the initial age hardening step (d) is conducted for between about 1 and about 8 hours at a temperature of between about 550° F. and about 700° F.

4. The process according to claim 1 wherein the secondary age hardening step (e) is conducted for between about 3 and about 24 hours at a temperature of between about 950° F. and about 1050° F.

5. A process for treating beryllium-copper alloy to optimize elevated temperature properties thereof, said process comprising in sequence:
   (a) annealing the alloy at a temperature of between about 1500° F. and about 1800° F.;
   (b) quenching the annealed alloy;
   (c) cold working the quenched alloy a minimum of about 30%;
   (d) re-annealing the alloy at a temperature of between about 1500° F. and about 1800° F.;
   (e) quenching the re-annealed alloy;
   (f) cold working the quenched re-annealed alloy a minimum of about 30%;
   (g) subjecting the cold worked alloy obtained in step (f) to an initial age hardening for between about 0.25 and about 48 hours at a temperature of between about 500° F. and about 800° F.; and
   (h) subjecting the age-hardened alloy to a secondary age hardening for between about 0.25 and about 48 hours at a temperature of between about 900° F. and about 1200° F.

6. The process according to claim 5 wherein the alloy is annealed in steps (a) and (d) by solution heat treatment at a temperature of between about 1650° F. and about 1750° F.

7. The process according to claim 5 wherein the initial age hardening step (g) is conducted for between about 1 and about 8 hours at a temperature of between about 550° F. and about 700° F.

8. A process according to claim 5 wherein the secondary age hardening step (h) is conducted for between about 3 and about 24 hours at a temperature of between about 950° F. and about 1050° F.

9. The process according to claim 1 or 5 wherein the beryllium-copper alloy consists essentially of between about 0.2 and about 1.0% by weight beryllium; up to about 5.0% by weight cobalt and up to about 3.5% by weight nickel with a total of said nickel and cobalt of between about 0.7 and about 5.0% by weight; up to about 1.0% by weight zirconium; up to about 0.005% by weight lead; up to about 0.5% by weight incidental impurities including lead; and the balance copper.

10. The process according to claim 1 or 5 comprising the additional steps of straightening the alloy obtained from steps (e) and (h) and stress relieving the straightened alloy.

11. An article of beryllium-copper alloy consisting essentially of between about 0.2 and about 1.0% by weight beryllium; up to about 5.0% by weight cobalt and up to about 3.5% by weight nickel with a total of said nickel and cobalt of between about 0.7 and about 5.0% by weight; up to about 1.0% by weight zirconium; up to 0.005% by weight lead; up to about 0.5% by weight incidental impurities including lead; and the balance copper; said alloy being subjected to a treatment comprising, in sequence:
   (a) annealing the alloy at a temperature of between about 1500° F. and about 1800° F.;
   (b) quenching the annealed alloy:
   (c) cold working the quenched alloy a minimum of about 30%;
   (d) subjecting the cold worked alloy to an initial age hardening for between about 0.25 and about 48 hours at a temperature of between about 500° F. and about 800° F.; and
   (e) subjecting the age-hardened alloy to a secondary age hardening for between about 0.25 and about 48 hours at a temperature of between about 900° F. and about 1200° F.

12. The article according to claim 11 wherein the alloy is annealed in step (a) by solution heat treatment at a temperature of between about 1650° F. and about 1750° F.

13. The article according to claim 11 wherein the initial age hardening step (d) is conducted for between about 1 and about 8 hours at a temperature of between about 550° F. and about 700° F.

14. The article according to claim 11 wherein the secondary stage hardening step (e) is conducted for between about 3 and about 24 hours at a temperature of between about 950° F. and about 1050° F.

15. An article of beryllium-copper alloy consisting essentially of between about 0.2 and about 1.0 by weight beryllium; up to about 5.0% by weight cobalt and up to about 3.5% by weight nickel with a total of said cobalt and nickel of between about 0.7 and about 5.0% by weight; up to about 1.0% by weight zirconium; up to 0.005% by weight lead; up to about 0.5% by weight incidental impurities including lead; and the balance copper; said alloy being subjected to a treatment comprising, in sequence:
- (a) annealing the alloy at a temperature of between about 1500° F. and about 1800° F.;
- (b) quenching the annealed alloy;
- (c) cold working the quenched alloy a minimum of about 30%;
- (d) re-annealing the alloy at a temperature of between about 1500° F. and about 1800° F;
- (e) quenching the re-annealed alloy;
- (f) cold working the quenched re-annealed alloy a minimum of about 30%;
- (g) subjecting the cold worked alloy obtained in step (f) to an initial age hardening for between about 0.25 and about 48 hours at a temperature of between about 500° F. and about 800° F.; and
- (h) subjecting the age-hardened alloy to a secondary age hardening for between about 0.25 and about 48 hours at a temperature of between about 900° F. and about 1200° F.

16. The article according to claim 15 wherein the alloy is annealed in steps (a) and (d) by solution heat treatment at a temperature of between about 1650° F. and about 1750° F.

17. The article according to claim 15 wherein the initial age hardening step (g) is conducted for between about 1 to and about 8 hours at a temperature of between about 550° F. and about 700° F.

18. The article according to claim 15 wherein the secondary age hardening step (h) is conducted for between about 3 and about 24 hours at a temperature of between about 550° F. and about 1050° F.

19. The article according to claim 11 or 15 wherein the alloy is subjected to the additional steps of straightening the alloy obtained in steps (e) and (h) and stress relieving the straightened alloy.

20. An article according to claim 11 or 15 in the form of a rotor wedge.

21. A beryllium-copper alloy rotor wedge according to claim 20 wherein the alloy is subjected to the additional steps of straightening the alloy obtained from steps (e) and (h) and stress relieving the straightened alloy.

* * * * *